US005941915A

United States Patent [19]

Federle et al.

[11] Patent Number: 5,941,915

[45] Date of Patent: Aug. 24, 1999

[54] SYSTEM FOR PROVIDING ACCURATELY TIME STAMPED VEHICLE OPERATIONAL MESSAGES FOLLOWING A REAL-TIME CLOCK RESET

[75] Inventors: Ken R. Federle; Joseph F. Mohos; Sara B. Dodds, all of Columbus, Ind.

[73] Assignee: Cummins Engine Company, Inc., Columbus, Ind.

[21] Appl. No.: 08/801,440

[22] Filed: Feb. 18, 1997

[51] Int. Cl.[6] .................... G06F 1/14; G07C 5/00

[52] U.S. Cl. .................... 701/1; 701/35; 340/438

[58] Field of Search .................... 701/1, 29, 30, 701/35; 395/200.78; 377/30, 32, 44; 340/438

[56] References Cited

U.S. PATENT DOCUMENTS

| | | | |
|---|---|---|---|
| 4,258,421 | 3/1981 | Juhasz et al. | 701/35 |
| 4,303,850 | 12/1981 | Juhasz et al. | 377/32 |
| 4,402,057 | 8/1983 | Itou et al. | 364/900 |
| 4,617,639 | 10/1986 | Paine | 364/569 |
| 4,939,652 | 7/1990 | Steiner | 701/35 |
| 4,991,101 | 2/1991 | Ishikawa | 701/103 |
| 5,142,470 | 8/1992 | Bristow et al. | 364/184 |
| 5,191,529 | 3/1993 | Ramsey et al. | 701/35 |
| 5,410,581 | 4/1995 | Hollenbeck et al. | 377/28 |
| 5,426,585 | 6/1995 | Stepper et al. | 702/85 |
| 5,535,217 | 7/1996 | Cheung et al. | 395/200.78 |

*Primary Examiner*—Tan Q. Nguyen
*Attorney, Agent, or Firm*—Woodard, Emhardt, Naughton Moriarty & McNett

[57] ABSTRACT

A system for providing accurately time stamped vehicle operational messages following a real-time clock reset includes a vehicle control computer having a processor, a memory and a real-time clock powered by a constant power source. The processor is operable to store a current value of the real-time clock in memory at engine shut down and to determine whether a clock reset event occurred since the previous engine operational cycle by testing a clock error flag in memory. If such a clock reset event occurred, the processor is operable to reset the real-time clock at the clock value stored at engine shut down and store this value in an error buffer of the memory. Upon establishment of communications with a time correction device having a master real-time clock, the processor is operable to determine whether the error buffer contains any clock values therein. If so, the processor is operable to correct the time stamps of all vehicle operational messages having time stamp values later than or equal to the clock value stored in the error buffer in accordance with the difference between the master clock value and the present value of the real-time clock, and to reset the real-time clock value to the master clock value.

30 Claims, 6 Drawing Sheets

60

| 62 | 64 | 66 |
|---|---|---|
| ID1 | DATA | TS1 |
| ID1 | DATA | TS2 |
| ID1 | DATA | TS3 |
| . | . | . |
| . | . | . |
| . | . | . |
| ID1 | DATA | TSX |

FIG. 3A

70

| 72 | 74 | 76 |
|---|---|---|
| ID1 | DATA | TS1 |
| ID1 | DATA | TS2 |
| ID1 | DATA | $TS_{SD+}$ |
| ID1 | DATA | $TS1_{SD+}$ |
| ⋮ | ⋮ | ⋮ |
| ID1 | DATA | $TSY_{SD+}$ |

FIG. 3B

80

| 82 | 84 | 86 |
|---|---|---|
| ID1 | DATA | TS1 |
| ID1 | DATA | TS2 |
| ID1 | DATA | $TS_{SD+} + \Delta_T$ |
| ID1 | DATA | $TS1_{SD+} + \Delta_T$ |
| ⋮ | ⋮ | ⋮ |
| ID1 | DATA | $TSY_{SD+} + \Delta_T$ |

FIG. 3C

| 92 | 94 | 96 |
|---|---|---|
| ID1 | DATA | TS1 |
| ID1 | DATA | TS2 |
| ID1 | DATA | $TS_{SD1+}$ |
| ID1 | DATA | $TS1_{SD1+}$ |
| ID1 | DATA | $TS2_{SD1+}$ |
| ID1 | DATA | $TS_{SD2+}$ |
| ID1 | DATA | $TS1_{SD2+}$ |
| . . . | | |
| ID1 | DATA | $TSZ_{SD2+}$ |

90

FIG. 4A

| 93 | 95 | 97 |
|---|---|---|
| ID1 | DATA | TS1 |
| ID1 | DATA | TS2 |
| ID1 | DATA | E |
| ID1 | DATA | E |
| ID1 | DATA | E |
| ID1 | DATA | $TS_{SD2+} + \Delta T$ |
| ID1 | DATA | $TS1_{SD2+} + \Delta T$ |
| . . . | . . . | . . . |
| ID1 | DATA | $TSZ_{SD2+} + \Delta T$ |

91

FIG. 4B

SYSTEM FOR PROVIDING ACCURATELY TIME STAMPED VEHICLE OPERATIONAL MESSAGES FOLLOWING A REAL-TIME CLOCK RESET

FIELD OF THE INVENTION

The present invention relates generally to systems for time stamping computer managed data, and more specifically to such systems for time stamping vehicle operational messages in accordance with real-time clock values.

BACKGROUND OF THE INVENTION

Data recorders for collecting and managing vehicle operational data or messages are known in the automotive and heavy duty truck industries. Data recorders are particularly useful in motor vehicles forming fleets such as taxis, buses and sales/service vehicles as well as product delivery/shipping vehicles including medium and heavy duty trucks to name a few. Vehicle operating data collected and managed by such data recorders are typically used by the fleet owner/manager for vehicle diagnostic purposes and/or for analyzing driver performance over one or more trips.

Since data analysis typically takes place some time after it is recorded, it is often beneficial, and sometimes necessary, to have information relating to the date and/or time at which the data was recorded. Data analyzers having such capability are thus able to link the vehicle operational data to vehicle operating conditions existing during data recordation such as, for example, a particular driver or group of drivers, weather conditions, geographic locations, road grade conditions encountered, and other vehicle operating conditions. To this end, designers of electronic data recorders have included therein real-time clocks which are operable to "time-stamp" the vehicle operational data or messages as they are recorded. As used herein, the term "time stamp" is defined as a real-time data identifier that forms a portion of data record for any given data message, and that identifies a calendar date, and optionally a time of day, at which the particular data message was recorded.

While such known real-time clock circuits or subsystems have been successful in accurately implementing data time stamping techniques, they have at least one inherent drawback associated therewith. Specifically, such circuits or subsystems rely on continuous electrical power provided thereto for accurate operation, and such accurate operation ceases when power is lost due to tampering, maintenance and/or other factors. When power is restored, the time value of the real-time clock circuit or subsystem is typically reset to some default value other than the actual calendar date and time of day, and therefore provides for inaccurate time stamping of subsequently stored data.

To combat the foregoing problem, designers of data recorders incorporating a real-time date/time stamping feature typically provide for some type of back up power source to supply electrical power to the real-time clock circuit for subsystem in the event of power loss from the primary power source. Examples of vehicle/engine data recorders incorporating back up, or stand-by, battery operation in the even of primary power loss are described in U.S. Pat. No. 4,303,850 to Juhasz et al. and U.S. Pat. No. 5,191,529 to Ramsey et al.

While such back up battery systems solve the above-described problem associated with the loss of power to the real-time clock circuit or subsystem, they introduce new drawbacks and concerns. For example, back up power systems are expensive to implement, both monetarily and in terms of space consumption. As more engine and vehicle functions become subject to electronic control, available circuit/system space within the vehicle, and specifically within a typical engine/vehicle control computer, correspondingly diminishes. Consumption of precious circuit/system real estate by a seldom used back up power system is therefore difficult to justify. Moreover, such back up power systems are not fail safe, and it is typically not until primary power failure occurs that the failure of the back up power system is discovered. Further, erroneous resetting of typical real-time clock circuits or subsystems can result from many factors or conditions other than primary power loss. In such cases, any back up power system is unable to prevent resetting of the real-time clock value to its default time value, and the actual clock value is resultantly lost.

What is therefore needed is a system for providing accurately time stamped vehicle operational messages which overcomes the problems associated with temporary loss of electrical power or other conditions which cause resetting of the real-time clock or subsystem, and which does not suffer from any of the drawbacks associated with the use of back up, or stand-by, power systems. Such a system should ideally be inexpensive and easily implemented while providing for highly accurate time stamped vehicle operational messages.

SUMMARY OF THE INVENTION

The present invention overcomes the foregoing drawbacks associated with prior art time stamping systems. In accordance with one aspect of the present invention, a system for accurately time stamping vehicle operational messages includes a vehicle control computer having a processor, a real-time clock powered by a constant electrical power source and a memory. The system is operable to store the value of the real-time clock during engine shut down and to set a clock error flag if a real-time clock reset event thereafter occurs. Upon engine start up, the processor resets the real-time clock to the value stored at engine shut down, and stores this clock value in an error buffer within memory, if the clock error flag is set. Thereafter during engine operation, the processor is operable to store vehicle operational messages with time stamps in memory wherein each time stamp corresponds to the current value of the real-time clock.

In accordance with another aspect of the present invention, a time correction device having a master real-time clock, which may be a data extraction device, is adapted for communication with the vehicle control computer. Upon detecting established communications with the time correction device, the processor determines whether any clock values are contained within the error buffer. If so, the processor determines a difference between the current value of the master real-time clock and the current value of the real-time clock in the vehicle control computer, corrects the time stamps having time stamp values equal to or later than the most recent clock value stored in the error buffer in accordance with the computed time difference, and then resets the real-time clock in the vehicle control computer to the current value of the master real-time clock. Thereafter, vehicle operational messages having accurate time stamp values can be extracted from memory. In this way, vehicle operational messages are accurately time stamped while avoiding the drawbacks associated with back up or stand-by power sources.

One object of the present invention is to provide a system for accurately time stamping vehicle operational messages with a real-time clock while avoiding inclusion of a back up or stand-by power source to provide electrical power to the real-time clock in the event of primary power loss.

Another object of the present invention is to provide a system for resetting such a real-time clock to the actual current time with an external time correction device.

These and other objects of the present invention will become more apparent from the following description of the preferred embodiments.

BRIEF DESCRIPTION OF THE DRAWINGS

FIG. 3A is a diagram of a number of example memory locations illustrating time sequenced storage of one vehicle operating parameter when no clock reset events occur;

FIG. 3B is a diagram illustrating time coding of various time stamps due to a real-time clock reset event experienced between the second and third entries of the diagram of FIG. 3A, in accordance with the present invention;

FIG. 3C is a diagram illustrating correction of the time stamps of all entries after the second entry of the diagram of FIG. 3B, in accordance with the present invention;

FIG. 4A is a diagram of a number of example memory locations illustrating time coding of various time stamps due to multiple real-time clock reset events, in accordance with the present invention;

FIG. 4B is a diagram illustrating corrective processing of the time stamps of all entries after the second entry of the diagram of FIG. 4A, in accordance with the present invention;

DESCRIPTION OF THE PREFERRED EMBODIMENTS

Figure 1:
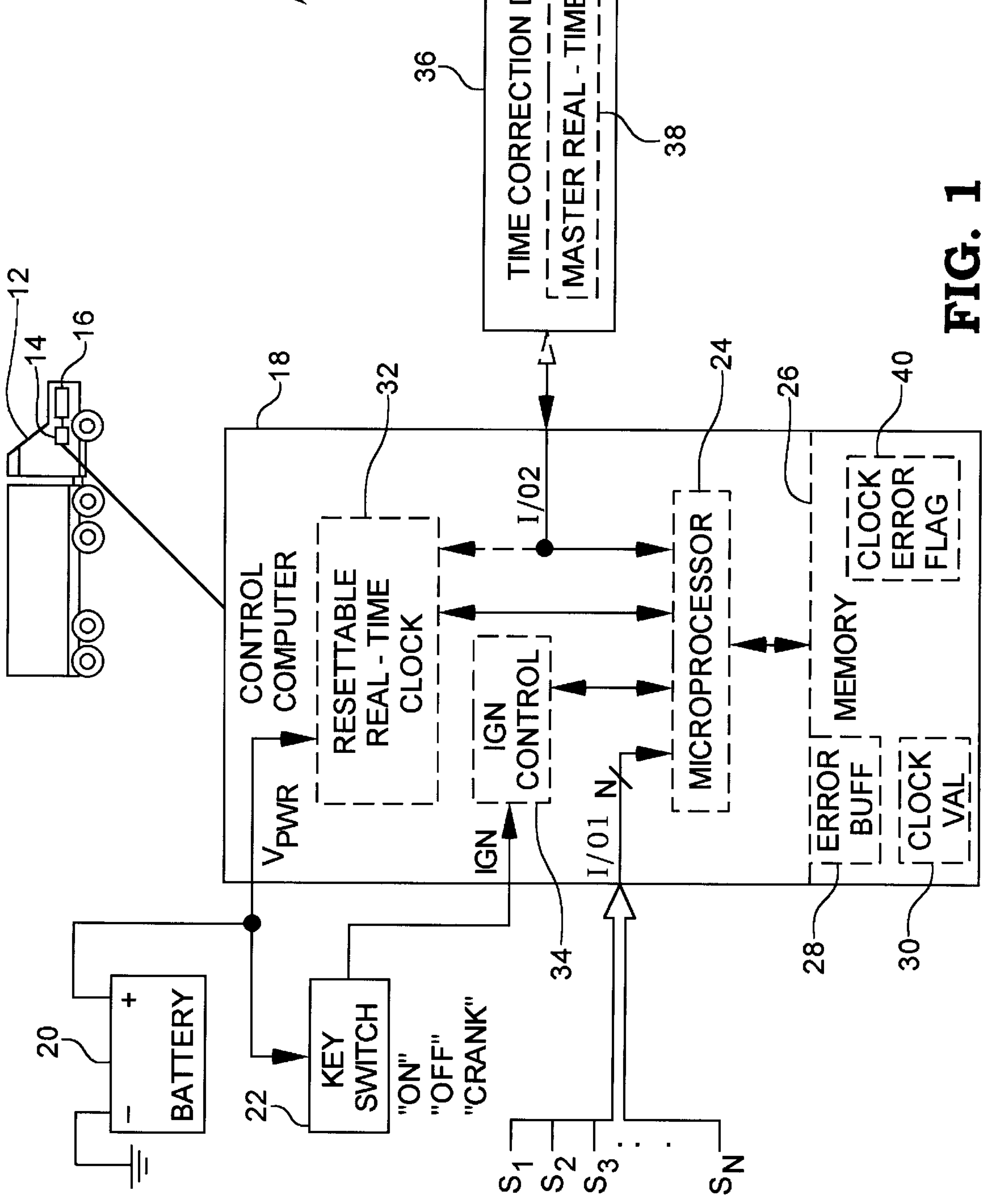
FIG. 1 is a diagrammatic illustration of a preferred embodiment of a system for providing accurately time stamped vehicle operational messages following a real-time clock reset, in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, a preferred embodiment of a system 10 for providing accurately time stamped vehicle operational data following a real-time clock reset, in accordance with the present invention, is shown. System 10 includes an electronic vehicle control system 14 operatively connected to an internal combustion engine 16 of a motor vehicle 12 as is known in the art. In one preferred embodiment, engine 16 is a diesel engine and vehicle 12 is a heavy or medium duty truck, although the present invention contemplates other known engine 16 and motor vehicle 12 combinations. In any case, control system 14 is preferably of the type commonly used in controlling motor vehicle operation generally by monitoring a plurality of electrical signals indicative of various engine and/or vehicle operating conditions and controlling various engine and/or vehicular functions in accordance therewith.

Central to control system 14 is a vehicle control computer 18 of the type commonly known and used in the automotive and heavy duty truck industry for monitoring and controlling vehicle and engine operating conditions. Such a vehicle control computer 18 is typically known as an Engine Control Module (ECM), Engine Control Unit (ECU), Vehicle Control Module (VCM) or the like, although the present invention contemplates that any computer capable of monitoring and controlling vehicle and engine operating conditions may be used with the present invention.

Electrical power is preferably provided to vehicle control computer 18 from two separate sources. First, a vehicle battery 20 is connected directly to a $V_{PWR}$ input of control computer 18 to provide a constant supply of electrical power thereto. Such a direct battery power connection is known and is typically used to provide continuous electrical power to certain circuits within control computer 18 even when the vehicle is not in operation. Secondly, the vehicle battery 20 is connected to a key switch 22 which provides switched electrical power "IGN" to control computer 18, as is known in the art, to provide electrical power to certain circuits included therein only during vehicle operation.

Key switch 22 preferably has three operational states as is known in the art, namely "On", "Off" and "Crank". In the "On" and "Crank" positions, switch 22 provides an electrical power signal from battery 20 to input IGN of control computer 12, thereby indicating an operational state of the vehicle. In the "Off" position, switch 22 disallows the electrical power signal from being applied to the IGN input of control computer 18, thereby indicating a vehicle shut down condition. It is to be understood, however, that the present invention contemplates using other known switch arrangements for providing switched electrical power to control computer 18 such as, for example, keyless switches, software switches requiring some type of predefined software code for activation thereof, and the like. Those skilled in the art will recognize that the importance of switch 22 lies not in its particular manifestation, but rather in its capability to provide switched electrical power to vehicle control computer 18. In any case, input IGN is preferably connected to an ignition control circuit 34.

Vehicle control computer 18 preferably includes a microprocessor 24, such as a Motorola 68332, for example, although the present invention contemplates providing control computer 18 with any known processor capable of managing the monitoring and control of the various vehicle operating parameters, as well as execute software algorithms according to the present invention which will be described hereinafter. Control computer 18 also includes an input/output port I/O1 connected to microprocessor 24 for receiving and sending electrical signals $S_1$–$S_N$ indicative of various vehicle operating parameters as is known in the art. Microprocessor 24 is also operatively connected to ignition control circuitry 34 for sending control signals thereto and receiving vehicle operational status signals therefrom.

Control computer 18 further includes a memory component 26 in communication with microprocessor 24 which preferably includes at least random access memory (RAM) and some type of a programmable read only memory (PROM) such as UV Erasable (EPROM), Electrically Erasable (EEPROM) and/or Flash memory. Memory 26 further includes an error buffer 28 that is preferably sized to hold multiple real-time clock values, and a clock value storage location 30 sized to hold at least one real-time clock value. As used herein, the term "real-time clock value" is defined as data indicative of an actual calendar date, an actual time of day, or a combination of the two.

Vehicle control computer 18 further includes a resettable real-time clock circuit 32 operatively connected to microprocessor 24. Real-time clock circuit 32 is responsive to the constant electrical power signal $V_{PWR}$ to produce a real-time clock signal which is provided to microprocessor 24. Microprocessor 24 is operable to convert the real-time clock signal to a real-time clock value to be associated with monitored vehicle operational data to be stored in memory 26 as will be described in greater detail hereinafter.

Preferably, real-time clock circuit 32 is designed to maintain a correct and accurate real-time clock value in the event of a temporary interruption in the $V_{PWR}$ signal for less than a predefined duration. In a preferred embodiment, the predefined duration is approximately 5.0 seconds, although other predefined durations are contemplated by the present invention. In any case, if the $V_{PWR}$, signal is lost or interrupted for more than the predefined duration, real-time clock circuit 32 loses the correct real-time value. In such a case, microprocessor 24 is operable to reset the real-time clock value to a predefined real-time clock value as will be described hereinafter.

In addition to a temporary loss of the $V_{PWR}$ signal for more than the predefined duration, other conditions within control computer 18 may similarly result in resetting of the real-time clock circuit 32. For example, any condition that causes vehicle control computer 18 to experience a power reset event typically causes microprocessor 24 to reset the real-time clock circuit 32 to a predefined real-time clock value. As another example, excessive noise, signal spiking or timing glitches on any of the signal paths leading to or from real-time clock circuit 32 may similarly result in resetting of clock circuit 32. A real-time clock circuit 32 reset event may thus occur as a result of any condition, transient or otherwise, that causes the real-time clock value to be reset to some value other than the present time. Under such reset conditions, power to the vehicle is typically lost and the engine must accordingly be restarted. As will be described in greater detail hereinafter, one aspect of the present invention is directed toward recognizing such real-time clock circuit 32 reset events and resetting the real-time clock value to a previously stored clock value in response thereto.

System 10 further includes a time correction device 36 adapted for communication with microprocessor 24 of vehicle control computer 18 via input/output port I/O2. Alternatively, time correction device may communicate directly with real-time clock circuit 32 as shown by the dashed-line connection between I/O2 and real-time clock circuit 32. In any case, time correction device 36 includes a master real-time clock 38 which is preferably an accurate clock that is easily resettable, such as via manual adjustment thereof, to produce a master clock signal corresponding to the actual current or present time.

In a preferred embodiment, time correction device 36 is a known data extraction tool commonly used in the automotive and heavy duty truck industry for extracting time stamped vehicle operational messages from memory 26 of vehicle control computer 18. Such a device 36 is typically plugged into port I/O2 and is operable to issue instructions to microprocessor 24 as well as receive time stamped vehicle operational messages therefrom. This bi-directional communication is illustrated in FIG. 1 by the solid and dashed-line arrows connecting device 36 to I/O2. In accordance with another aspect of the present invention, vehicle control computer 18 is operable to recognize connection of data extraction tool 36 to I/O2, determine a difference between the most recently stored real-time clock value and the master clock value, and correct the time stamp values of all vehicle operational messages having time values equal to or later than the most recently stored real-time clock value. In so doing, the time stamp values may either be corrected and restored in memory 26 prior to extraction of the corresponding vehicle operational messages, or corrected as the corresponding vehicle operational messages are being extracted from memory 26. In either case, microprocessor 24 is further operable to reset the real-time clock value to the master clock value so that real-time clock circuit 32 produces a real-time clock signal corresponding to the actual current or present time.

The present invention contemplates that time correction device 36 may alternatively be simply a master real-time clock 38 that is operable to correct time stamp values in memory 26 and reset the real-time clock value of the real-time clock circuit 32, as previously discussed, without extracting vehicle operational messages having corrected time stamp values. In such a case, communication with vehicle control computer 18 need not be bi-directional so that the dashed-line arrow may be omitted between I/O2 and device 36. Further, while correction of time stamp values is preferably undertaken via microprocessor 24, resetting of the real-time clock circuit 32 to the master clock value may optionally be accomplished by direct communication between device 36 and real-time clock circuit 32 as shown by the dashed-line signal path connecting real-time clock circuit 32 to I/O2.

Regardless of the type of time correction device 36 used, it is to be understood that the present invention contemplates other known techniques besides hardwire contact for establishing communications between device 36 and vehicle control computer 18. For example, known contacting or contactless arrangements may be used to establish such communications utilizing any of a variety of electromagnetic communication signals such as broadcast radio frequency waves, infra-red waves, visible light and ultra-violet waves to name a few. The importance of any such communication arrangement lies mainly in its ability to provide vehicle control computer 18 with an accurate master clock value and to accurately extract vehicle operational messages with corrected time stamp values if desired.

Figure 2:
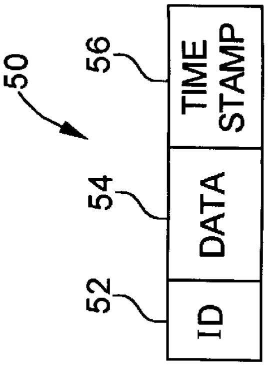
FIG. 2 is a diagram of an example memory storage location illustrating one data and associated time stamp storage scheme for use with the present invention.

Referring now to FIG. 2, an example of one technique 50 for storing vehicle operational messages with associated time stamp values in memory 26, according to the present invention, is shown. Preferably, each vehicle operational message includes a message identifier (ID) portion 52, a DATA portion 54 corresponding to the vehicle operational message and a TIME STAMP portion 54 corresponding to the real-time clock value at which the vehicle operational message 54 was stored in memory 26. It is to be understood, however, that the present invention contemplates alternative techniques for storing vehicle operational messages with associated time stamp values in memory 26, the importance being that any such technique include provisions for storing at least the vehicle operational messages and associated time stamp values with the capability of distinguishing between the two.

The present invention takes advantage of capability of the master real-time clock 38 of the time correction device 36 having an easily adjustable master clock value. Since the master real-time clock 38 can easily be set or adjusted to produce the actual current or present real-time clock value, incorrectly time stamped vehicle operational messages can be corrected, either within memory 26 or as the messages are being extracted, with a high degree of accuracy if the time stamps of the vehicle operational messages are properly stored within memory 26.

In accordance with the present invention, microprocessor 24 writes the current real-time clock value of real-time clock circuit 32 into the clock value storage location 30 when the ignition control circuitry 34 produces a control signal to microprocessor 24 indicative of engine shut down (corresponding to detection of switching key switch 22 to the "Off" position). Each time microprocessor 24 detects engine shut down, the real-time clock value stored in clock value storage location 30 is replaced with the current real-time clock value of the real-time clock circuit 32. In this manner, the clock value storage location 30 always holds the real-time clock of the most recent engine shut down event.

If, while the engine 16 is non-operational (in a shut down condition), the real-time clock value of the real-time clock circuit 32 is reset due to any of the reset events or conditions discussed hereinabove, a clock error flag 40 is set within memory 26. When the ignition control circuitry 34 produces a control signal to microprocessor 24 indicative of engine start up (corresponding to detection of switching key switch 22 to the "On" position), microprocessor 24 checks the status of the clock error flag 40. If the clock error flag 40 is set, microprocessor 24 resets the clock value of the real-time clock circuit 32 to the clock value stored in the clock value storage location 30 of memory 26, and further stores this clock value in the error buffer 28 of memory 26. During subsequent engine operation, microprocessor 24 stores vehicle operational messages within memory 26, as needed, wherein each vehicle operational message has a time stamp value equal to the clock value of the real-time clock circuit 32 at the time that the corresponding message was stored in memory 26. It is to be understood that the foregoing process may occur more than once before the clock value of the real-time clock circuit 32 is corrected so that the error buffer 28 may contain more than one clock value therein.

When microprocessor 24 detects establishment of communications with time correction device 36, microprocessor 24 checks the error buffer 28 of memory 26 for the presence of any clock values stored therein. If microprocessor 24 finds no clock values stored within the error buffer 28 of memory 26, then no time stamp corrections are performed and, if time correction device 36 is a data extraction device, device 36 instructs microprocessor 24 to download vehicle operational messages and associated time stamp values thereto. If, on the other hand, microprocessor 24 finds a clock value stored within the error buffer 28, microprocessor 24 determines a time difference between the present master clock value of master real-time clock 38 and the present real-time clock value of real-time clock circuit 32. Microprocessor 24 then adds this time difference to all time stamps having time stamp values equal to or later than the clock value stored within the error buffer 28, thereby correcting such time stamp values. As discussed hereinabove, the offset time stamp values may be corrected as they are being extracted from memory 26 or may alternatively be corrected and re-stored within memory 26 for subsequent extraction by data extraction device 36. In either case, microprocessor 24 thereafter erases the clock value stored in error buffer 28.

In addition to correcting time stamp values offset in time from the actual times at which their corresponding vehicle operational messages were stored in memory 26, microprocessor 24 is operable to reset the real-time clock value of real-time clock circuit 32 to the current master clock value of master clock 38. In this manner, real-time clock circuit 32 may be reset to the actual current real-time and need not include an expensive battery back up unit to produce accurately time stamped vehicle operational messages.

Referring now to FIGS. 3A–3C, an example of the foregoing technique for correcting time stamp values within memory 26 for one vehicle operational message ID1 is shown. Referring to FIG. 3A, a table 60 is shown illustrating storage of multiple vehicle operational messages ID1 in a timeline sequence thereof when no real-time clock circuit 32 reset event has occurred. Table 60 includes a column 62 containing the vehicle operational message identifier ID1, a column 64 containing the various vehicle operational messages (DATA) and a column 66 containing the time stamp values TS1–TSX indicative of the actual times at which the corresponding vehicle operational messages were stored in memory 26.

Referring now to FIG. 3B, a table 70 is shown illustrating storage of the multiple vehicle operating messages ID1 when a real-time clock circuit 32 reset event has occurred after storing the vehicle operational message at time TS2. Table 70 includes a column 72 containing the vehicle operational message identifier ID1, a column 74 containing the various vehicle operational messages (DATA) and a column 76 containing the time stamp values TS1–$TSY_{SD+}$ indicative of the times at which the corresponding vehicle operational messages were stored in memory 26 in accordance with the present invention. As shown in column 76, time stamp values TS1 and TS2 are identical to time stamp values TS1 and TS2 of table 60 and correspond to actual real times at which their corresponding vehicle operational messages were stored within memory 26. However, in table 70, a real-time clock circuit 32 reset condition occurred after storing the vehicle operational message with time stamp TS2.

In accordance with the present invention, microprocessor 24 stores the real-time clock value $TS_{SD}$ of real-time clock circuit 32 that existed during engine shut down (after storing TS2) within the clock value storage location of memory 30. Subsequent to engine shut down, the real-time clock circuit 32 reset event occurs to which microprocessor 24 responds by setting a corresponding flag in clock error flag location 40 of memory 26. Upon vehicle start up, microprocessor 24 reads the clock error flag location 40, determines that a clock reset condition occurred, resets the real-time clock value of real-time clock circuit 32 to the clock value $TS_{SD}$ stored in clock value memory location 30, stores the clock value $TS_{SD}$ in error buffer 28 of memory 26 and clears the clock error flag from flag location 40. At some time $TS_{SD+}$ following engine start up, microprocessor 24 proceeds to store vehicle operational messages having time stamp values $TS_{SD+}'$–$'TSY_{SD+}$.

Referring now to FIG. 3C, a table 80 is shown illustrating correction of the time stamps having time stamp values offset in time according to the present invention. Table 80 includes a column 82 containing the vehicle operational message identifier ID1, a column 84 containing the various vehicle operational messages (DATA) and a column 86 containing the corrected time stamp values corresponding to actual times at which the vehicle operational messages were stored in memory 26. In accordance with the present invention, microprocessor 24 is operable to determine a difference $\Delta_T$ between the master clock value of master real-time clock 38 and the real-time clock value of real-time clock circuit 32 upon detection of communications established between vehicle control computer 18 and time correction device 36. Thereafter, microprocessor 24 adds the value $\Delta_T$ to all time stamps having values later than or equal to $TS_{SD}$. Thus, as shown in column 86, the value $\Delta_T$ is added to each of the time stamp values $TS_{SD+}$–$TSY_{SD+}$, thereby correcting these offset time stamp values to the actual times at which their corresponding vehicle operational messages were stored in memory 26.

The present invention recognizes that multiple real-time clock circuit 32 reset conditions may occur before offset time stamp values are corrected and/or the real-time clock value of the real-time clock circuit 32 is reset. In accordance with another aspect of the present invention, error buffer 28 of memory 26 is accordingly sized to contain multiple clock values therein. If microprocessor 24 finds multiple clock values within error buffer 28, only the time stamps having time stamp values later than or equal to the latest clock value found within error buffer 28 are corrected as described hereinabove. Since all time stamp values prior to the earliest clock value found within the error buffer 28 are correct, only time stamps having time stamp values between the earliest clock value and the latest clock value cannot be corrected with a high degree of accuracy according to the present invention. Accordingly, microprocessor 24 flags all time stamps having time stamp values between the earliest clock value and the latest clock value and computes a maximum amount of error associated with such time stamp values. Since all such time stamp values necessarily fall between the earliest clock value and the latest clock value stored within the error buffer 28, the maximum amount of error is simply the difference between these two clock values.

Referring now to FIGS. 4A and 4B, an example of the foregoing technique for correcting time stamp values within memory 26 for one vehicle operational message ID1 is shown wherein multiple real-time clock circuit 32 reset events have occurred. Referring to FIG. 4A, a table 90 is shown illustrating storage of multiple vehicle operational messages ID1 in a timeline sequence thereof when multiple real-time clock circuit 32 reset events have occurred. Table 90 includes a column 92 containing the vehicle operational message identifier ID1, a column 94 containing the various vehicle operational messages (DATA) and a column 96 containing the time stamp values $TS1$–$TSZ_{SD2+}$ indicative of the times at which the corresponding vehicle operational messages were stored in memory 26 in accordance with the present invention. As shown in column 96, time stamp values TS1 and TS2 are identical to time stamp values TS1 and TS2 of table 60 (FIG. 3A) and correspond to actual real times at which their corresponding vehicle operational messages were stored within memory 26. However, in table 90, multiple real-time clock circuit 32 reset events have occurred after storing the vehicle operational message with time stamp TS2.

In accordance with the present invention, microprocessor 24 stores the real-time value $TS_{SD1}$ of real-time clock circuit 32 that existed during engine shut down (after storing TS2) within the clock value storage location 30 of memory 26. Subsequent to engine shut down, the first real-time clock circuit 32 reset event occurs to which microprocessor 24 responds by setting a corresponding flag in clock error flag location 40 of memory 26. Upon vehicle start up, microprocessor 24 reads the clock error flag location 40, determines that a clock reset event has occurred, resets the real-time clock value of real-time clock circuit 32 to the clock value $TS_{SD1}$ stored in clock value memory location 30, stores the clock value $TS_{SD1}$ in error buffer 28 of memory 26 and clears the clock error flag from flag location 40. At some time $TS_{SD1+}$ following engine start up, microprocessor 24 proceeds to store vehicle operational messages having time stamp values of $TS_{SD1+}$–$\mathbf{TS2}_{SD1+}$.

Some time after storing the vehicle operational message having time stamp value $TS2_{SD1+}$, a second real-time clock circuit 32 reset event occurs. Microprocessor 24 undertakes the process just described and proceeds to store vehicle operational messages having time stamp values of $TS_{SD2+}$–$TSZ_{SD2+}$.

Referring now to FIG. 4B, a table 91 is shown illustrating correction of the time stamps having time stamp values offset in time according to the present invention. Table 91 includes a column 93 containing the vehicle operational message identifier ID1, a column 95 containing the various vehicle operational messages (DATA) and a column 97 containing the corrected time stamp values. In accordance with the present invention, microprocessor 24 is operable to determine a difference $\Delta_T$ between the master clock value of master real-time clock 38 and the real-time clock value of real-time clock circuit 32 upon detection of communications established between vehicle control computer 18 and time correction device 36. Thereafter, microprocessor 24 adds the value $\Delta_T$ to all time stamps having values later than or equal to $TS_{SD2}$. Thus, as shown in column 86, the value $\Delta_T$ is added to each of the time stamp values $TS_{SD2+}$–$TSZ_{SD2+}$, thereby correcting these offset time stamp values to the actual times at which their corresponding vehicle operational messages were stored in memory 26. The time stamp values $TS_{SD1+}$–$TS2_{SD1+}$ are flagged, as shown in column 97 with an "E", as having inaccurate time stamp values.

Figure 5:
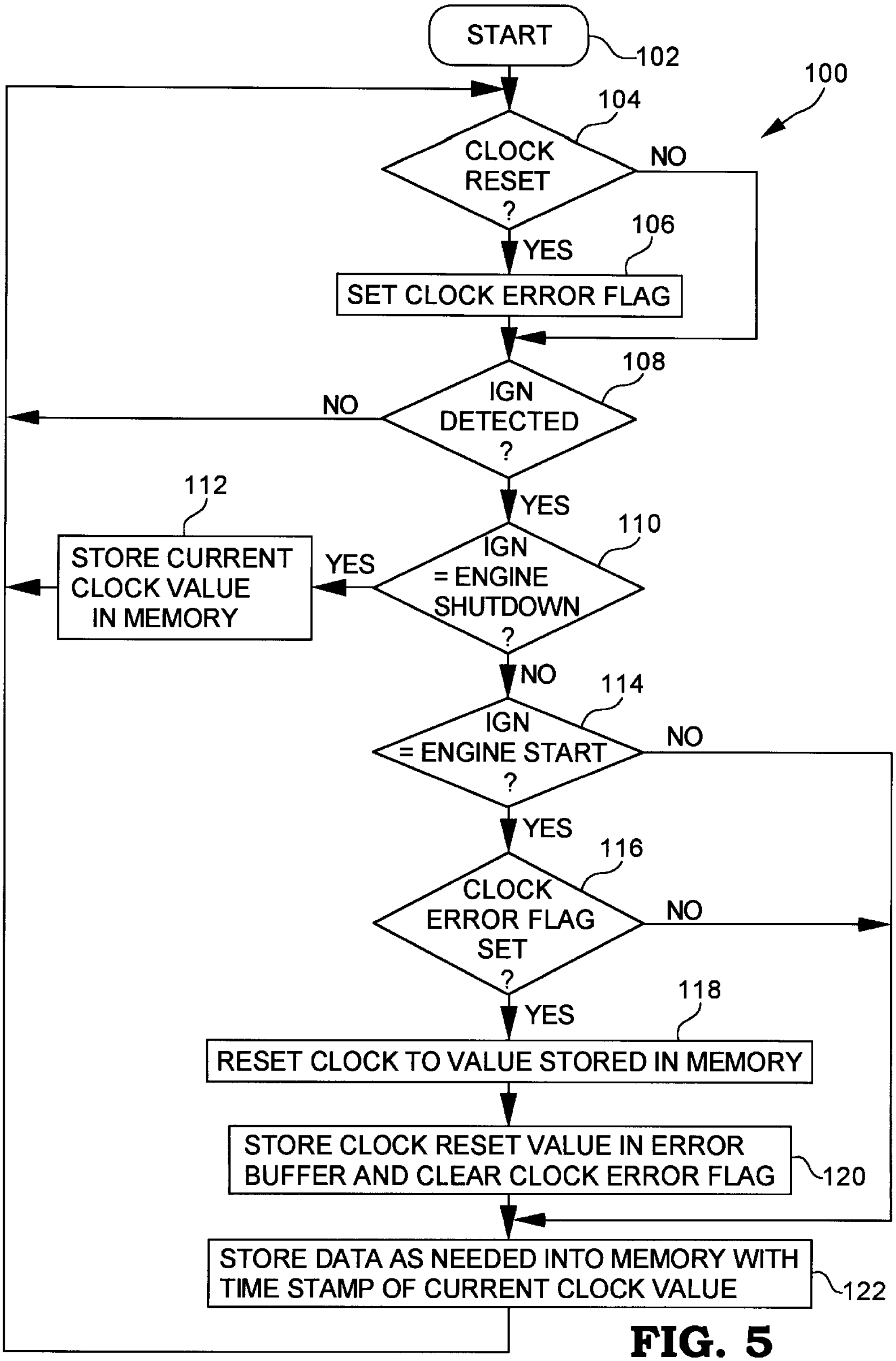
FIG. 5 is a flow chart illustrating one embodiment of a software algorithm for time stamping and storing data in memory, in accordance with the present invention.

Referring now to FIGS. 5, a flow chart illustrating a preferred embodiment of a software algorithm 100 for storing vehicle operational messages in memory 26, in accordance with the present invention, is shown. Preferably, algorithm 100 is executed by microprocessor 24 many times per second. Algorithm 100 begins at step 102 and at step 104 microprocessor 24 determines whether a real-time clock circuit 32 reset event has occurred. If so, algorithm execution continues at step 106 where microprocessor sets a clock error flag in clock error flag location 40 of memory 26. After step 106, and if microprocessor 24 does not detect occurrence of a reset event at step 104, algorithm execution continues at step 108 where microprocessor 24 determines the status of the ignition signal IGN.

If, at step 108, no ignition signal IGN is detected, then the engine 16 is not running and algorithm execution returns to step 104. If, however, an ignition signal IGN is detected at step 108, algorithm execution continues at step 110 where microprocessor 24 determines whether the status of the ignition signal IGN corresponds to an engine shut down condition. If an engine shut down condition is detected at step 110, algorithm execution continues at step 112 where microprocessor 24 stores the current real-time clock value of real-time clock circuit 32 into the clock value storage location 30 of memory 26 and returns thereafter to step 104. If, however, an engine shut down condition is not detected at step 110, algorithm execution continues at step 114 where microprocessor 24 determines whether the status of the ignition signal IGN corresponds to an engine start up condition. If no engine start up condition is detected at step 114, the ignition signal IGN corresponds simply to an engine running condition and algorithm execution continues at step 122.

If an engine start up condition is detected at step 114, algorithm execution continues at step 116 where microprocessor 24 checks the clock error flag location 40 in memory 26 to determine whether a clock error flag has been set. If microprocessor 24 determines at step 116 that a clock error flag has not been set, then no real-time clock circuit 32 reset event has occurred since the previous engine operational cycle and algorithm execution continues at step 122. If, however, microprocessor 24 determines at step 116 that a clock error flag has been set, then a real-time clock circuit 32 reset event has occurred since the previous engine operational cycle and algorithm execution continues at step 118 where microprocessor 24 resets the real-time clock value of real-time clock circuit 32 to the clock value stored at step 112 in the clock value storage location 30. Thereafter at step 120, microprocessor 24 stores this clock reset value in the error buffer 28 of memory 26 and clears the clock error flag from clock error flag location 40.

Following step 120, and following the "NO" decisional paths of steps 114 and 116, algorithm execution continues at step 122 where microprocessor 24 stores vehicle operational messages and associated time stamp values in memory 26 as needed, wherein each time stamp value corresponds to the real-time clock value of real-time clock 32 at the time its associated vehicle operational message is stored in memory 26. From step 122, algorithm execution continues at step 104.

Figure 6A:
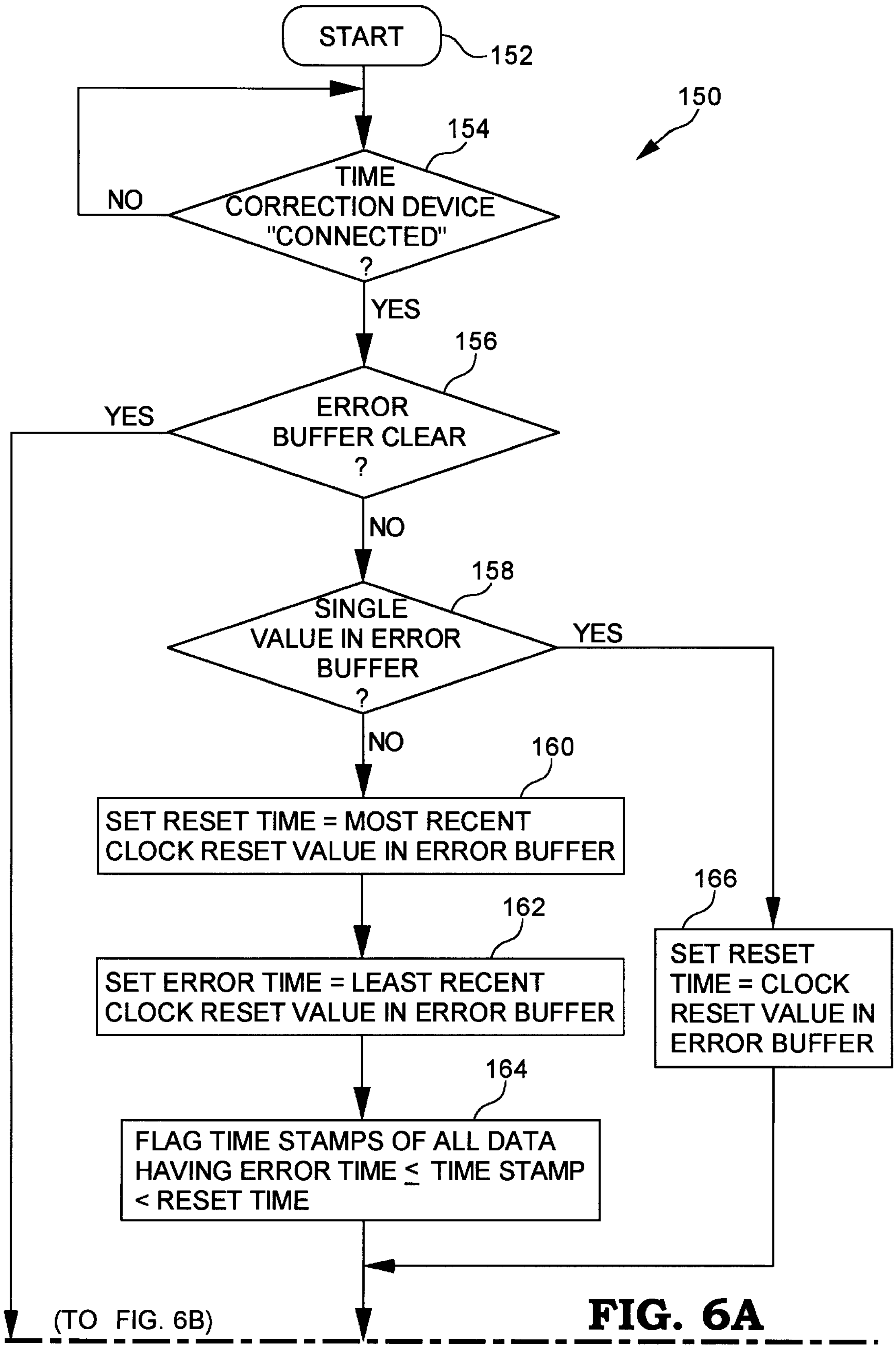
FIG. 6 is composed of FIGS. 6A and 6B and a flow chart illustrating one embodiment of a software algorithm for correcting inaccurately time stamped data and resetting the real-time clock value to a current time value, in accordance with the present invention.
Figure 6B:
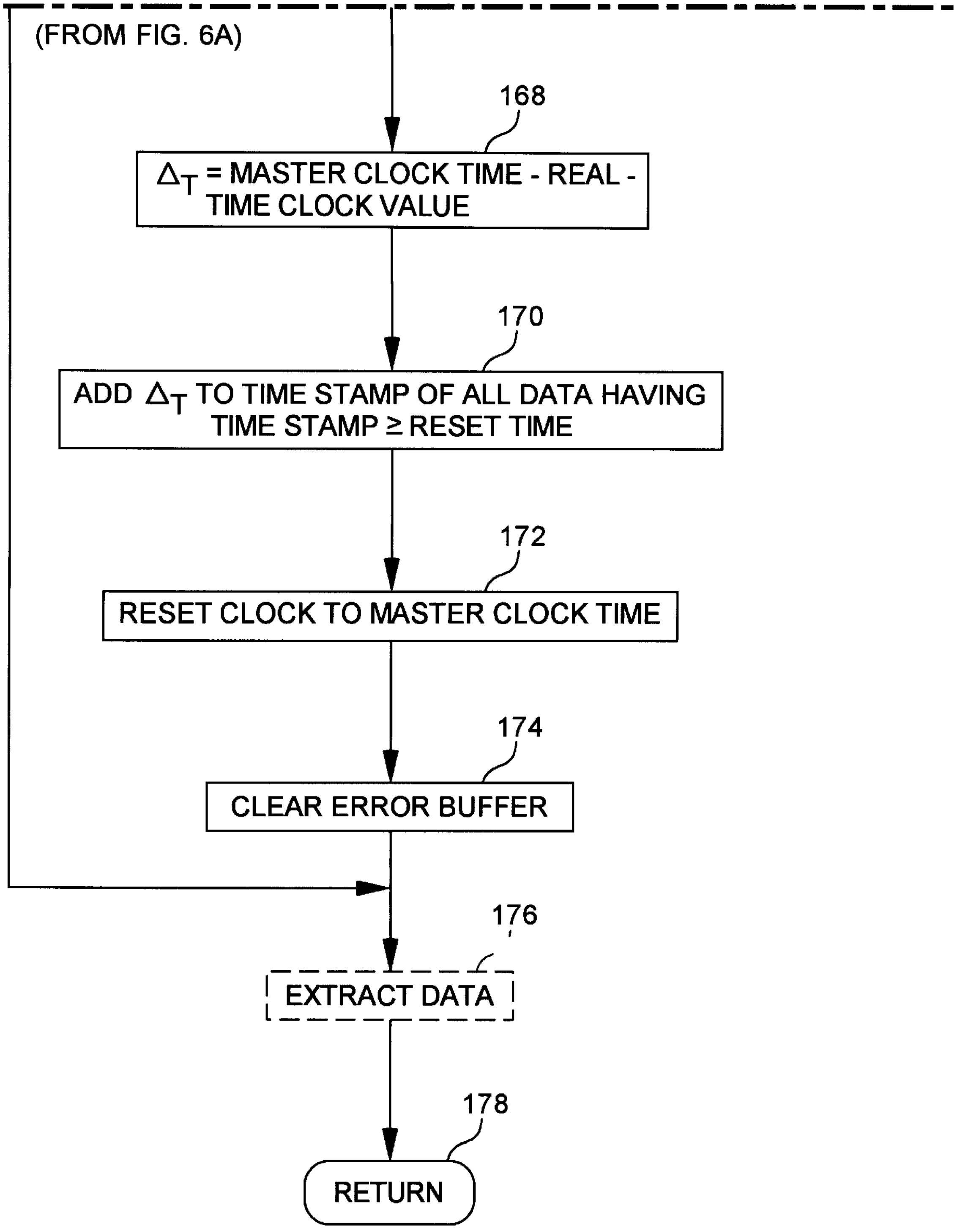

Referring now to FIGS. 6A and 6B, a flow chart illustrating one embodiment of a software algorithm 150 for correcting inaccurately time stamped vehicle operational messages, in accordance with the present invention, is shown. As with algorithm 100, algorithm 150 is preferably executed by microprocessor 24 many times per second. Algorithm 150 begins at step 152 and at step 154 microprocessor 24 determines whether communications have been established with time correction device 36 as described hereinabove. If communications have been established, algorithm execution continues at step 156. If not, the algorithm loops back to step 154.

At step 156, microprocessor 24 determines whether error buffer 28 contains any clock values therein. If not, algorithm execution continues at optional step 176. If microprocessor 24 determines at step 156 that error buffer 28 contains at least one clock value therein, algorithm execution continues at step 158 where microprocessor 24 determines the number of clock values contained in error buffer 28. If only one clock value is contained in error buffer 28, algorithm execution continues at step 166 where microprocessor 24 sets a reset time value is equal to the clock value stored therein and algorithm execution continues at step 168. If, however, multiple clock values are contained in error buffer 28, algorithm execution continues at step 160 where microprocessor 24 sets the reset time value is equal to the most recent, or latest, clock value stored in error buffer 28. Algorithm execution continues from step 160 at step 162 where microprocessor sets an error time value equal to the least recent, or earliest, clock value stored in error buffer 28. Algorithm execution continues from step 162 at step 164 where microprocessor flags the time stamps of all vehicle operational messages having time stamp values later than or equal to the error time value and less than the reset time value. Algorithm execution continues from step 164 at step 168.

At step 168, microprocessor 24 calculates a difference value $\Delta_T$ as the difference between the present master clock value of master real-time clock 38 and the present real-time clock value of real-time clock circuit 32. Thereafter at step 170, microprocessor 24 adds the $\Delta_T$ value to all time stamps having time stamp values later than or equal to the reset time value. Algorithm execution continues from step 170 at step 172 where microprocessor 24 resets the real-time clock value of real-time clock circuit 32 to the present master clock value of master real-time clock 38. Thereafter at step 174, microprocessor 24 clears error buffer 28.

Algorithm execution continues from step 174, and from the "YES" decisional path of step 156, at optional step 176. Step 176 is included in the case that time correction device 36 is a data extraction device. If so, microprocessor 24 is operable at step 176 to download vehicle operational messages having corrected time stamp values to data extraction device 36. Algorithm execution continues from optional step 176 at step 178 where algorithm 150 is returned to its calling routine.

The present invention is illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of time stamping and storing vehicle operational messages in a system including a resettable real-time clock, a memory and an ignition circuit producing a vehicle operational signal corresponding to a vehicle operating condition and a vehicle shut down signal, comprising the steps of:

storing a current value of the real-time clock in memory upon detection of the vehicle shut down signal;

resetting the real-time clock to said current value stored in memory in response to a preexisting real-time clock error upon detection of the vehicle operating signal; and storing vehicle operational messages with associated time stamps in memory as long as the vehicle operating signal is present, each of said time stamps corresponding to a present value of the real-time clock at the time of storing its associated vehicle operational message in memory.

2. The method of claim 1 wherein said preexisting real-time clock error corresponds to a real-time clock reset condition resetting the real-time clock to a default value prior to detection of the vehicle operating signal.

3. The method of claim 2 further including the step of storing a clock error flag in a clock error memory location of the system in response to said real-time clock reset condition prior to detection of the vehicle operating condition.

4. The method of claim 3 wherein the conditional of said preexisting real-time clock error in said resetting step corresponds to detection of said clock error flag in the clock error memory location.

5. The method of claim 2 wherein the real-time clock is responsive to a power signal provided thereto by a power source of the system to produce a real-time clock value;

and wherein said clock reset condition results from a restoration of said power signal following a temporary interruption thereof.

6. The method of claim 1 further including the step of storing said current value of the real-time clock stored in memory into a clock error storage location of the system in response to said preexisting real-time clock error upon detection of the vehicle operating signal.

7. A method of ensuring accurate time stamp values of time stamped vehicle operating messages stored in a memory component of a vehicle control system wherein a set of time stamps having time values equal to or later than an error time value are offset in time from actual times at which they were stored in the memory component if an error storage location of the system contains an error time value, comprising the steps of:

performing the following steps only if the error storage location contains the error time value;

determining a correction value corresponding to a difference between time values of the set of time stamps having time values equal to or later than the error time value and the actual real times at which they were stored in the memory component; and correcting time values of those time stamps having time values equal to or later than the error time value according to said correction value.

8. The method of claim 7 wherein said performing step further includes the conditional:

and otherwise extracting at least some of the vehicle operating messages and associated time stamp values from the memory component.

9. The method of claim 7 further including the step of extracting at least some of the vehicle operating messages having corrected time stamp values.

10. The method of claim 7 wherein the vehicle control system includes a resettable real-time clock producing a real-time clock value;

and wherein said correction value corresponds to a difference between a master clock value and a current value of the real-time clock.

11. The method of claim 10 wherein said correcting step includes adding said correction value to each of the time stamp values having time values equal to or later than the error time value.

12. The method of claim 11 further including the step of resetting the current value of the real-time clock to said master clock value.

13. The method of claim 12 further including the step of erasing the error time value from the error storage location of the vehicle control system.

14. The method of claim 7 wherein said correction value corresponds to a difference between the time values of the set of time stamps having time values equal to or later than the latest error time value if the error storage location contains more than one error time value; and wherein said correcting step includes correcting time values of those time stamps having time values equal to or later than the latest error time value according to said correction value and flagging all time stamps having time values between the earliest error time value and the latest error time value.

15. A method of producing accurately time stamped vehicle operational messages in a vehicle control system including an error buffer, a real-time clock producing a real-time clock signal and a memory, comprising the steps of:

storing vehicle operational messages with associated time stamp values in memory during vehicle operation, each of said time stamp values corresponding to a present value of the real-time clock signal at the time of storing its associated vehicle operational message in memory;

storing a clock reset value in the error buffer in response to detection of a real-time clock error; and correcting the time stamp values of all vehicle operational messages having time stamp values equal to or later than said clock reset value as a function of a difference between a present value of the real-time clock signal and an actual real-time clock value upon detection of said clock reset value in the error buffer.

16. The method of claim 15 wherein the real-time clock is responsive to a power signal provided thereto by a power source of the vehicle control system to produce the real-time clock signal;

and wherein said real-time clock error occurs in response to restoration of the power signal following a temporary interruption thereof.

17. The method of claim 15 wherein said clock reset value corresponds to a value of the real-time clock prior to said real-time clock error.

18. The method of claim 17 further including the step of extracting from memory at least some of the vehicle operational messages having corrected time stamp values.

19. The method of claim 17 further including the step of resetting the present value of the real-time clock to said actual real-time clock value.

20. A system for time stamping and storing vehicle operational messages corresponding to vehicle operating parameters, comprising:

a resettable real-time clock circuit producing a real-time clock signal;

a memory for storing therein vehicle operational messages with associated time stamp values, each of said time stamp values indicative of times at which corresponding ones of said messages are stored in said memory;

ignition circuitry responsive to a first control signal to produce a vehicle operating signal and to a second control signal to produce a vehicle shut down signal; and a processor in communication with said real-time clock circuit, said memory and said ignition circuitry, said processor responsive to said vehicle shut down signal to store a corresponding value of said real-time clock signal in said memory, to detection of said vehicle operating signal and a preexisting real-time clock error to reset said real-time clock circuit to said real-time clock value stored in said memory, and to at least one vehicle operating parameter and said real-time clock signal to store vehicle operational messages with associated time stamps in said memory as long as said vehicle operating signal is present, each of said time stamps having a time stamp value corresponding to a present value of said real-time clock signal at the time of storing its associated message in said memory.

21. The system of claim 20 further including an electrical power source producing an electrical power signal;

wherein said real-time clock circuit is responsive to said electrical power signal to produce said real-time clock signal.

22. The system of claim 21 wherein said real-time clock error corresponds to a temporary interruption in said electrical power signal.

23. A system for ensuring accurate time stamp values of time stamped vehicle operational messages, comprising:

a real-time clock circuit producing a real-time clock signal;

a memory having stored therein vehicle operational messages with associated time stamp values, each of said time stamp values indicative of times at which corresponding ones of said messages were stored in said memory;

an error storage location having a clock reset value stored therein if a set of said time stamp values equal to or later than said clock reset value are offset from actual real times at which they were stored in said memory; and a processor in communication with said real-time clock circuit, said memory and said error storage location, and adapted for communication with a device having a real-time clock producing a master clock signal, said processor responsive to the master clock signal to determine a correction value corresponding to a difference between the master clock signal and said real-time clock signal and correct said set of time stamp values in accordance with said correction value if said clock reset value is stored in said error storage location.

24. The system of claim 23 wherein the device having a real-time clock producing the master clock signal is a data extraction device.

25. The system of claim 23 wherein said processor is responsive to the master clock signal to reset said real-time clock circuit to produce a real-time clock signal equal to a present value of the master clock signal.

26. The system of claim 25 wherein said processor is further responsive to the master clock signal to clear said clock reset value from said error storage location after correcting said set of time stamp values and resetting said real-time clock circuit.

27. A system for producing accurately time stamped vehicle operational messages corresponding to vehicle operating parameters, comprising:

a real-time clock circuit producing a real-time clock signal;

a memory for storing therein vehicle operational messages with associated time stamp values, each of said time stamp values indicative of times at which corresponding ones of said messages are stored in said memory;

an error storage location;

a processor in communication with said real-time clock circuit, said memory and said error storage location, said processor responsive to at least one vehicle operating parameter and said real-time clock circuit to store corresponding vehicle operational messages with associated time stamp values according to said real-time clock signal in said memory, and to a real-time clock circuit error to store a clock reset value in said error storage location; and a device having a master real-time clock producing a master clock signal and adapted for communication with said processor, said processor responsive to said master clock signal to correct time stamp values of all vehicle operational messages having time stamp values equal to or later than said clock reset value as a function of said master clock signal and said real-time clock signal if said clock reset value is stored in said error storage location.

28. The system of claim 27 wherein said device having a master real-time clock is a data extraction device.

29. The system of claim 28 wherein said device is operable to extract vehicle operational messages and associated time stamp values from said processor, wherein at least some of the vehicle operational messages have corrected time stamp values.

30. The system of claim 27 further including an electrical power source producing an electrical power signal;

and wherein said real-time clock circuit is responsive to said electrical power signal to produce said real-time clock signal;

and wherein said real-time clock error corresponds a temporary interruption in said electrical power signal provided to said real-time clock circuit.

* * * * *